Aug. 23, 1932.    A. TROSCH    1,873,678
MACHINE LATHE
Filed Oct. 5, 1928    8 Sheets-Sheet 1

INVENTOR
Alfred Trosch
BY Harold E. Stonebraker
his ATTORNEY

Aug. 23, 1932.  A. TROSCH  1,873,678
MACHINE LATHE
Filed Oct. 5, 1928  8 Sheets-Sheet 2
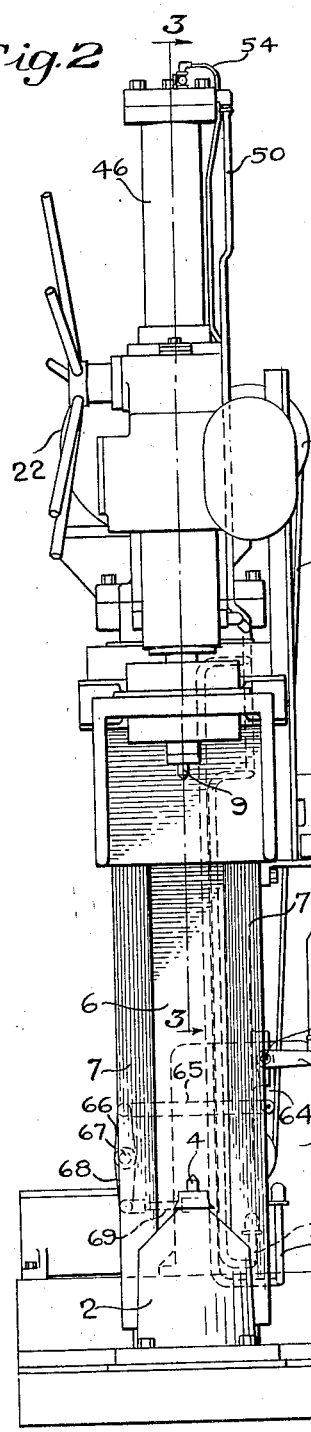
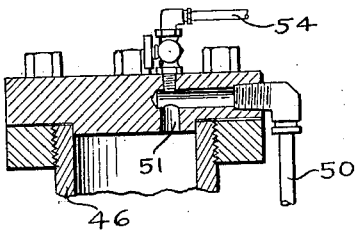
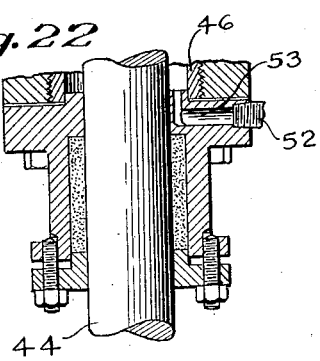
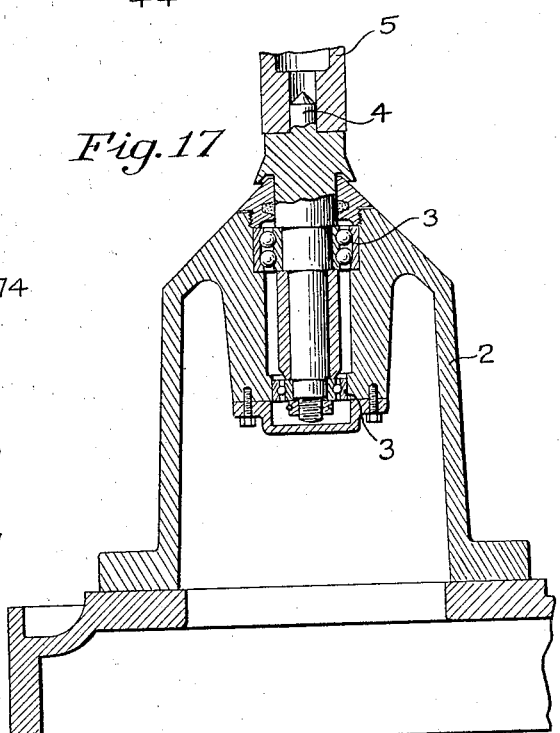
INVENTOR
Alfred Trosch
BY
Harold E. Stonebraker
his ATTORNEY

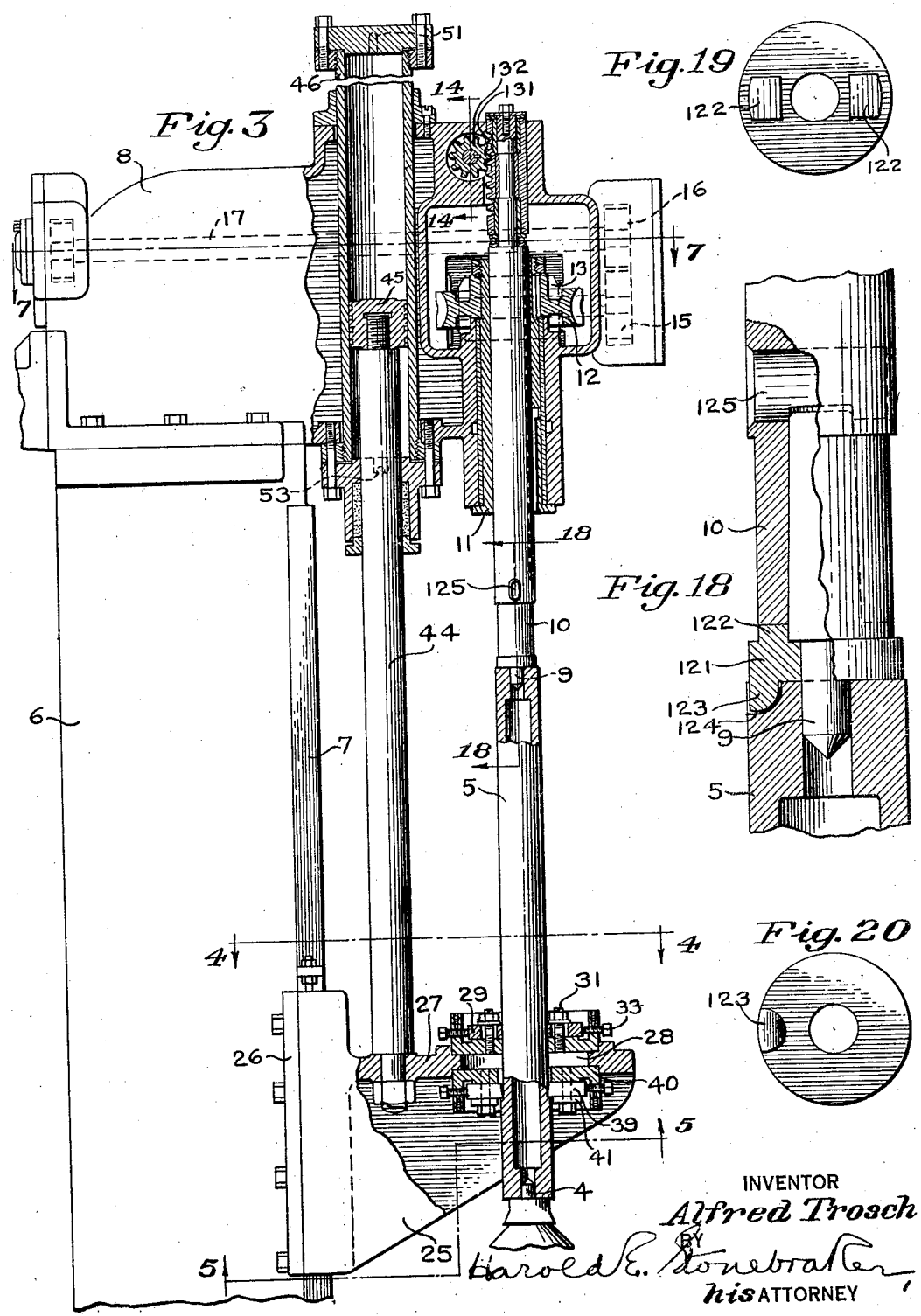

Aug. 23, 1932.  A. TROSCH  1,873,678
MACHINE LATHE
Filed Oct. 5, 1928  8 Sheets-Sheet 4
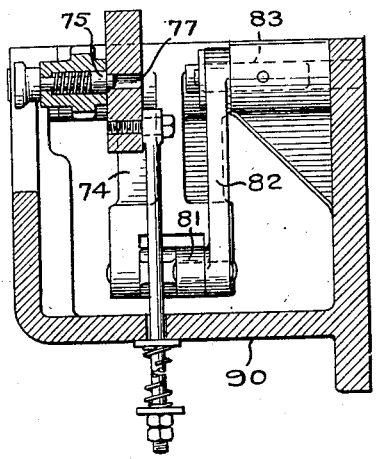
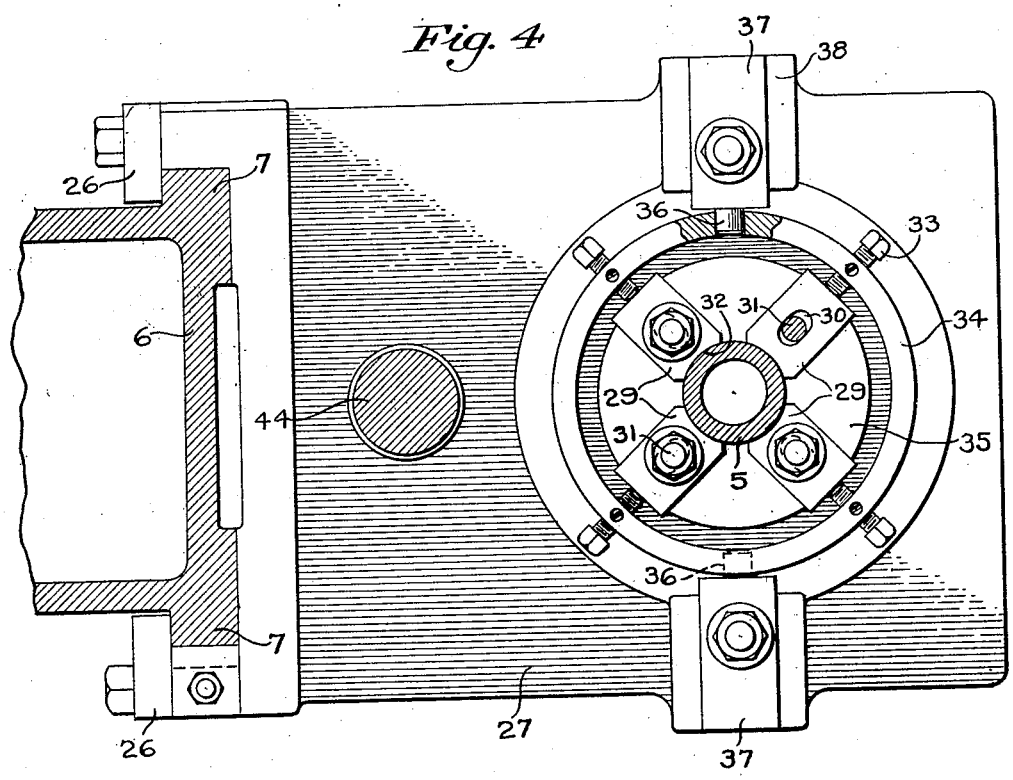
INVENTOR.
Alfred Trosch
BY Harold E. Stonebraker
HIS ATTORNEY

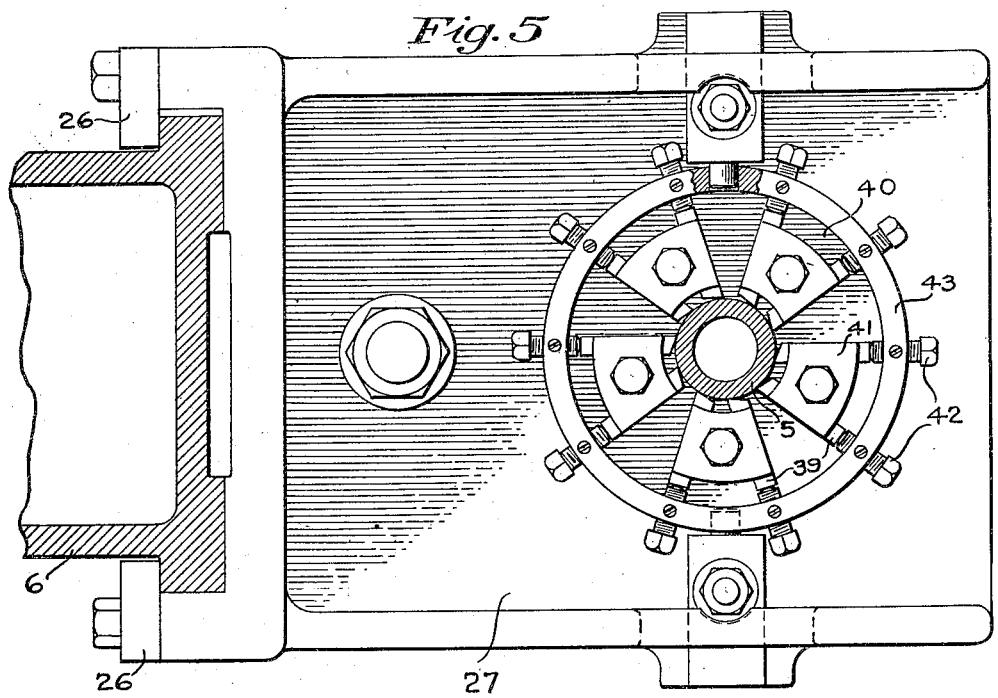
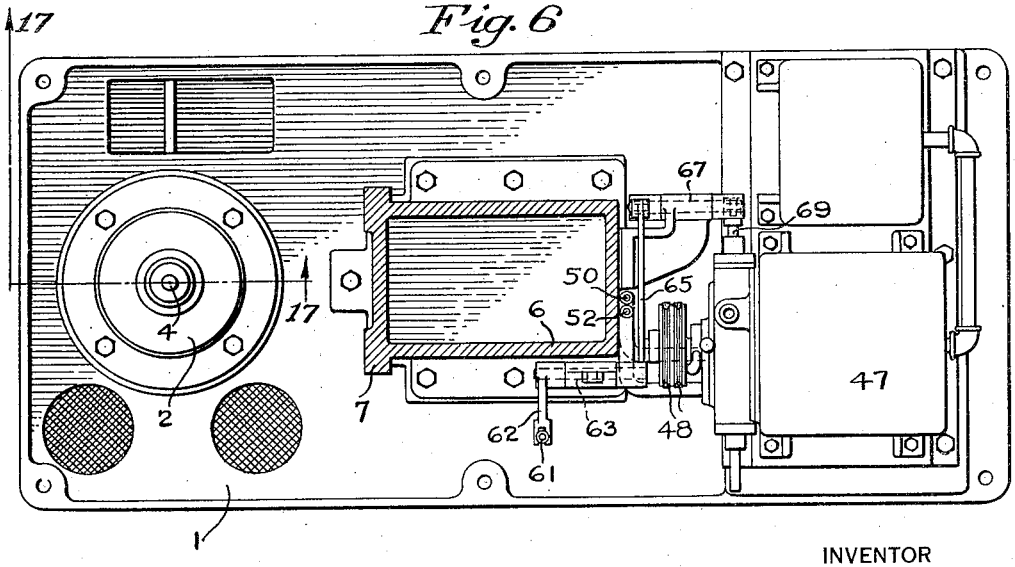

Aug. 23, 1932.   A. TROSCH   1,873,678
MACHINE LATHE
Filed Oct. 5, 1928   8 Sheets-Sheet 6
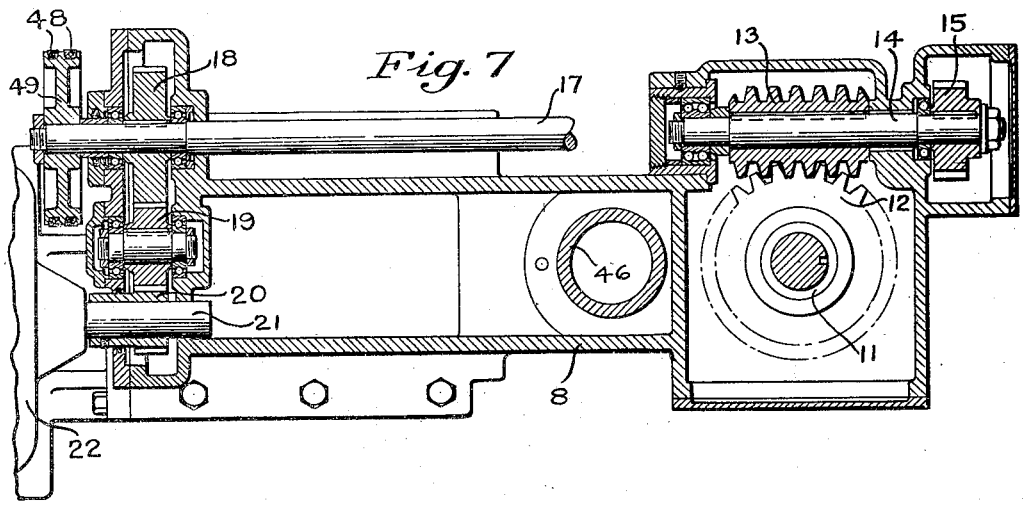
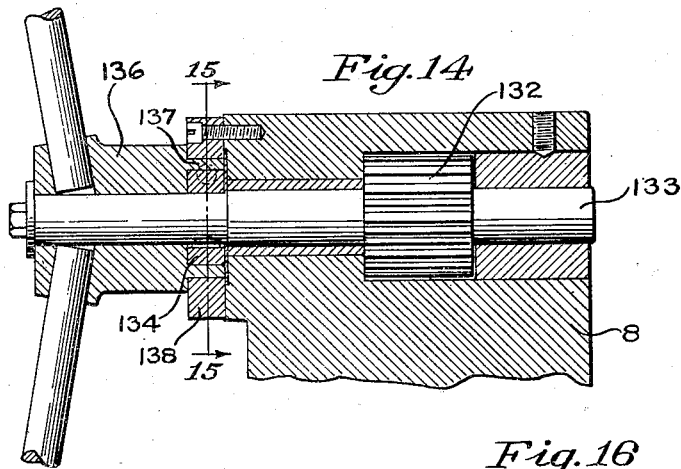
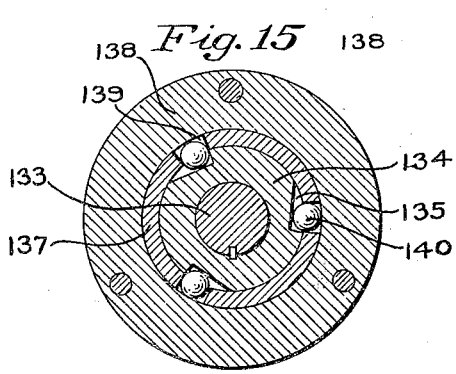
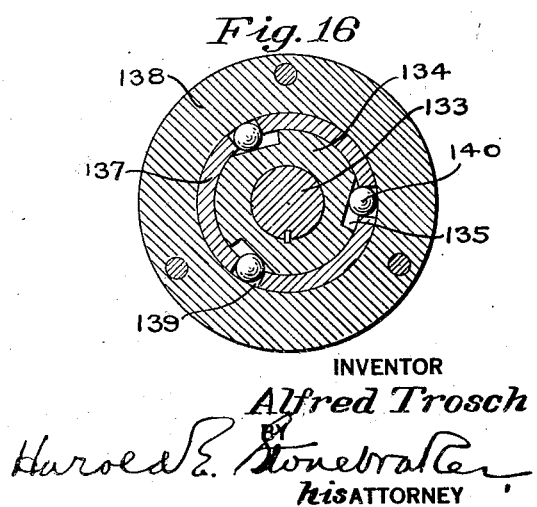
INVENTOR
Alfred Trosch
BY Harold E. Stonebraker
his ATTORNEY Aug. 23, 1932.   A. TROSCH   1,873,678
MACHINE LATHE
Filed Oct. 5, 1928   8 Sheets-Sheet 7
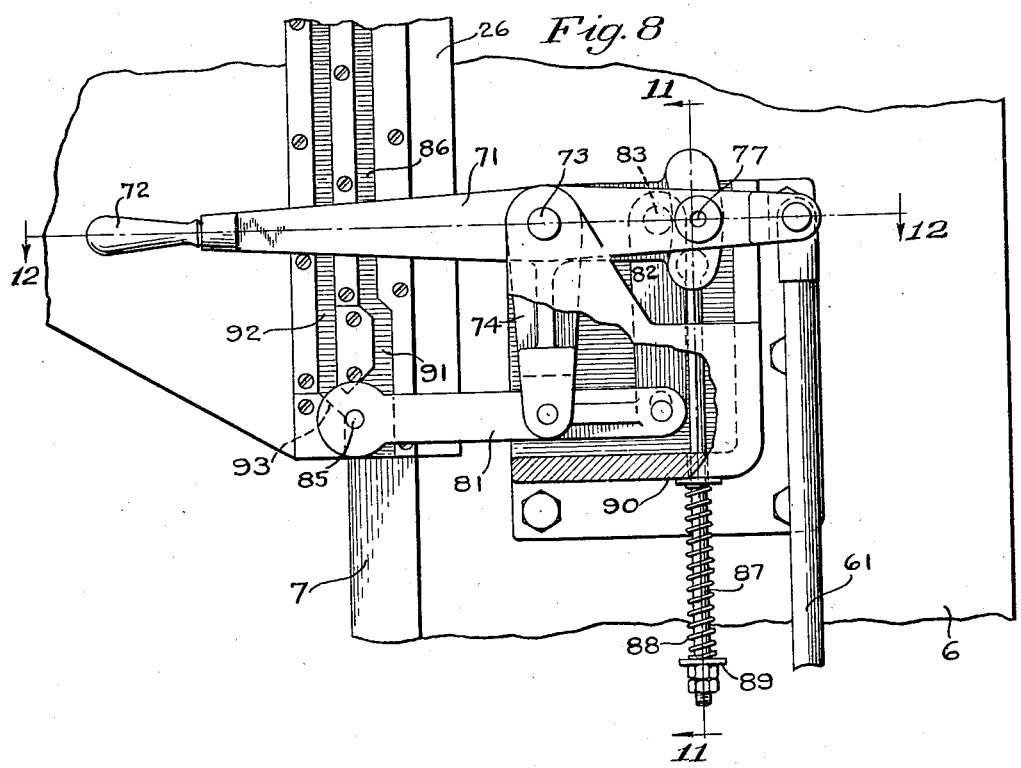
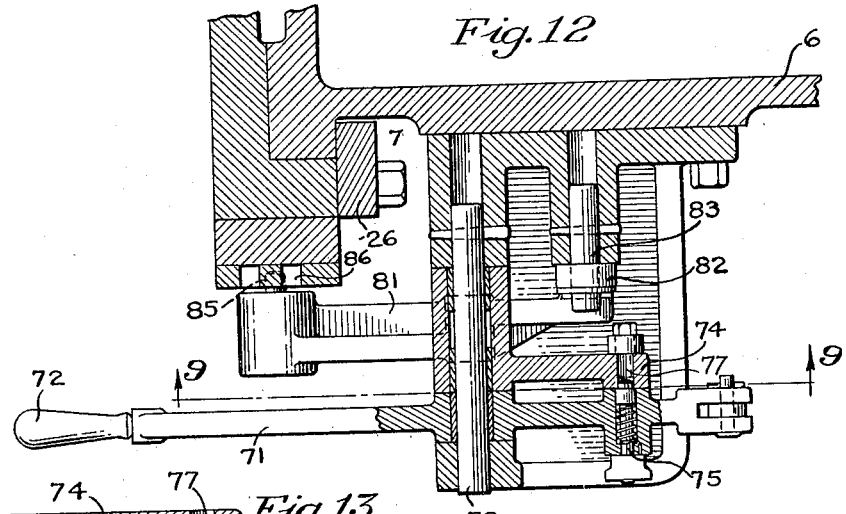
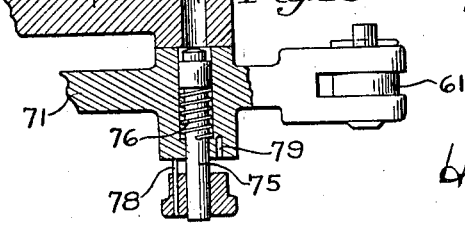
INVENTOR
Alfred Trosch
his ATTORNEY

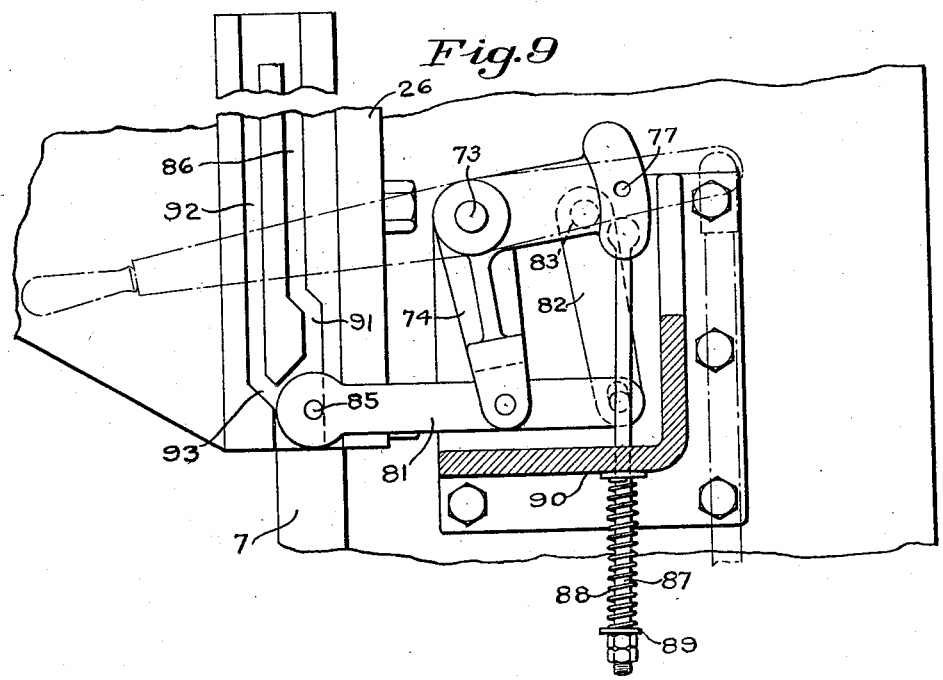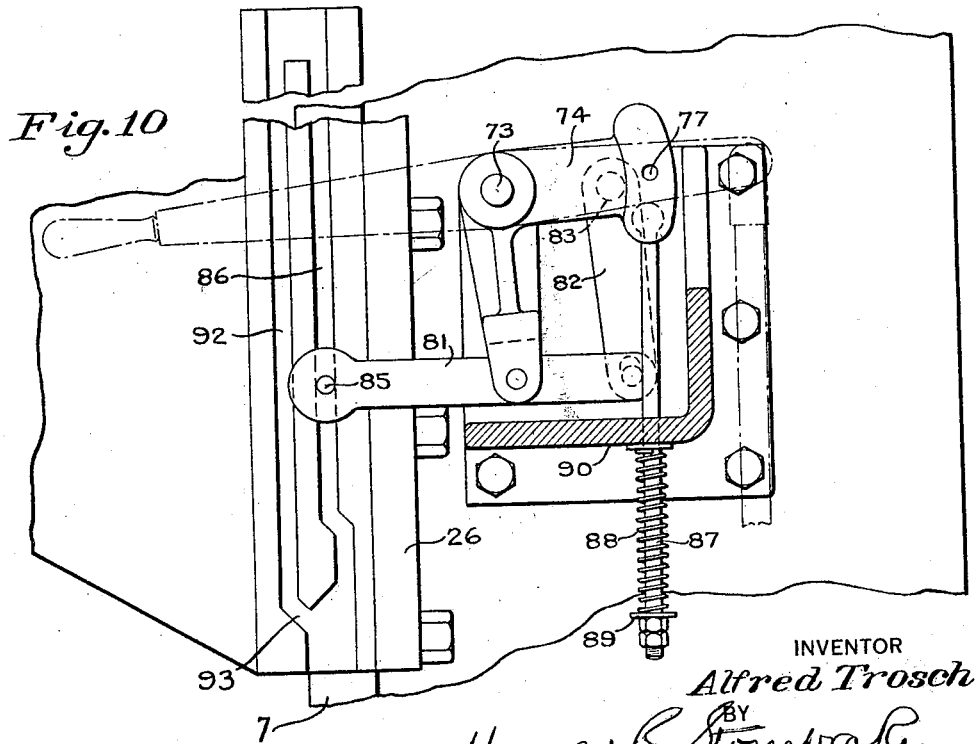

Patented Aug. 23, 1932

1,873,678

UNITED STATES PATENT OFFICE

ALFRED TROSCH, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MACHINE LATHE

Application filed October 5, 1928. Serial No. 310,616.

This invention relates to a vertical turning machine, and has for a particular purpose to afford a mechanism for finishing husking rolls and similar cylindrical blanks of uniform length.

One object of the invention is to afford a machine that lends itself to fast production, accurate positioning of the work, and efficient operation thereon.

Another purpose is to provide an arrangement of parts that enables an operator to quickly position a roll vertically for the required turning operations.

A further object of the invention is to afford mechanism that enables an operator to easily and quickly bring the tools into operative relation with the work.

An additional purpose is to afford an efficient and practicable design of parts that permits utilizing liquid pressure means such as an oil gear mechanism for raising and lowering a tool carrier with reference to the work.

Still another object of the invention is to afford a simple, dependable structure for automatically controlling the operation of the tool carrier after the work is positioned and the movement of the tool carrier is initiated by manual or other suitable instrumentality.

An additional purpose of the improvement is to provide a machine that occupies a minimum of floor space and requires but little attention in the course of its usual operation.

With these and other ends in view, the invention comprises the construction and arrangement of parts that will appear clearly from the following description when read in conjunction with the accompanying drawings, the novel features being pointed out in the claims following the description.

In the drawings:

Figure 2 is an end elevation;

Figure 3 is a sectional view taken vertically on the line 3—3 of Figure 2, with parts appearing in elevation;

Figure 4 is a horizontal sectional view on line 4—4 of Figure 3;

Figure 5 is a horizontal sectional view on line 5—5 of Figure 3;

Figure 6 is a horizontal sectional view on line 6—6 of Figure 1;

Figure 7 is a horizontal sectional view on line 7—7 of Figure 3;

Figure 8 is an enlarged side elevation of the mechanism for governing the fluid pressure means operating the tool carrier, and showing the parts in initial position;

Figure 9 is a similar view showing the position of the parts after the manual operation which initiates movement of the tool carrier downwardly;

Figure 10 is a similar view showing the position of the parts during downward movement of the tool carrier;

Figure 11 is a vertical sectional view on line 11—11 of Figure 8;

Figure 12 is a horizontal sectional view on line 12—12 of Figure 8;

Figure 13 is an enlarged horizontal sectional view in detail showing the position of the parts when the manually operated lever is disconnected from the cam controlled means;

Figure 14 is an enlarged sectional view on line 14—14 of Figure 3;

Figure 15 is a sectional view on line 15—15 of Figure 14, showing the position of the parts as the live center is being elevated;

Figure 16 is a similar view showing the position of the parts with the live center lowered in clamped relation to the work;

Figure 17 is a vertical sectional view on line 17—17 of Figure 6;

Figure 18 is a vertical sectional view on line 18—18 of Figure 3;

Figure 19 is a top plan view of the collar for interlocking the live spindle support with the work roll;

Figure 20 is a bottom plan view of said collar;

Figure 21 is a detail sectional view through the top of the fluid pressure cylinder above the work carrier, and Figure 22 is a detail sectional view through the bottom of said cylinder.

Figure 1:
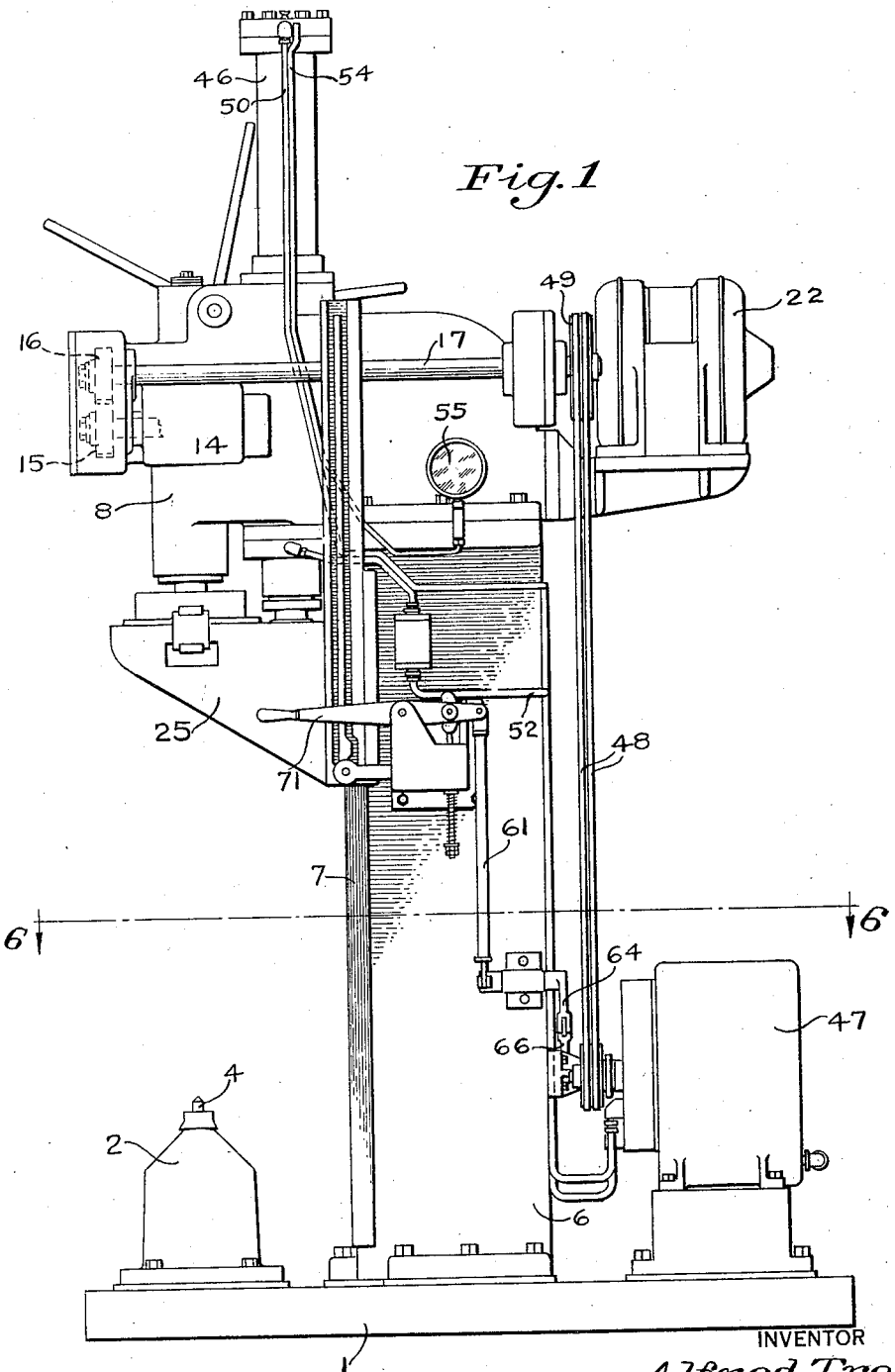
Figure 1 is a side elevation of a machine embodying a preferred arrangement of the several features of the invention.

Referring more particularly to the drawings in which like reference characters refer to the same parts throughout the several views, 1 designates the base of the machine and 2 is a pedestal provided with suitable bearings 3 within which is rotatably mounted the dead center 4 on which the work is supported, such work in the present instance being a husking roll of the form designated at 5. The roll 5 is engaged at its upper end and rotated by mechanism that will be hereinafter fully described.

Mounted on the base 1 is an upright or column 6 that includes vertical guides or rails 7, and has mounted on the top thereof a housing 8 which supports the driving mechanism for the work and tool carrier, as will now be described. The roll 5 is engaged at its upper end by the live center 9 that is held in a support 10, the latter being longitudinally movable and held against relative rotative movement within a sleeve 11. The sleeve 11 is rigidly connected to a worm gear 12 which is driven by a worm 13, see Figures 3 and 7, the latter being mounted on a stub shaft 14. The shaft 14 has fixed thereon a pinion 15 that is engaged and driven by a pinion 16 on spindle 17 which carries at its opposite end a pinion 18. The pinion 18 is driven by an idler pinion 19 that in turn is operated by pinion 20 on the armature shaft 21 of an electric driving motor 22, from which the power for the machine is derived. Through the mechanism thus far described, the work roll 5 is rotated, during which movement the tools are moved downwardly for operative engagement with the work.

To accomplish such downward travel of the tools, a tool carrier is provided, as designated generally at 25, see Figure 3, including overhanging guide plates 26 that engage the guides 7 of the column, upon which the tool carrier travels. The tool carrier also includes a platform 27 having an opening 28 that surrounds the work roll as the tools and tool carrier travel downwardly. Mounted preferably on the upper side of the platform 27 is a steadying means preferably in the form of work engaging fingers 29 having slots 30 to receive attaching bolts 31, the fingers having concave inner faces 32 engaging the work and adjustable thereagainst by the screws 33. The latter are mounted in the annular portion 34 of the supporting plate 35 which rests in a recess in the platform 27, see Figures 3 and 4, and is retained in position by pins 36 in the blocks 37 which are adjustable on the platform in ways 38, the pins 36 engaging openings in the annular portion 34.

39 designate the tools which are mounted on the underside of the platform 27 in a support 40, each pair of tools being retained in the support by a retaining plate 41, see Figure 5, and adjustable toward the work by adjusting screws 42 engaging the annular portion 43. The tool carrier is operated by fluid pressure means preferably consisting of an oil gear pump of conventional type and to this end carries a vertical rod or plunger 44 that is located between the column and the work 5. The plunger 44 at its upper end carries a piston 45 that travels in a cylinder 46, to the opposite ends of which oil is alternately forced to move the tool carrier downwardly and upwardly, such movement of the piston 45 within the cylinder being brought about by an oil gear pump designated generally at 47, see Figure 1, the latter being operated by belts 48 that engage and are driven by pulleys 49 on the aforementioned shaft 17.

The oil or other fluid pressure passes from the pump to the upper end of the cylinder through pipe 50 and passage 51, while communication is had with the lower end of the cylinder through pipe 52 and passage 53, see Figures 1 and 22, 54 being a pipe leading from the top of the cylinder to a pressure gauge 55. It is to be understood that the construction of the oil pump forms no part of this invention since this type of mechanism is well known, and any convenient form may be used in which a control member is movable from a neutral position in two directions, one direction of movement causing the liquid to be forced to one end of the cylinder to move the piston downwardly and the other direction of movement causing the liquid to be forced to the other end of the cylinder to move the piston upwardly. The structure which is employed herein for initially moving this control member and automatically effecting its return to neutral position after a cycle is completed will now be described.

Referring to Figures 1, 6 and 8 to 12, 61 designates what will be termed the control member, pivotally connected at its lower end to an arm 62 on a rock shaft 63 which carries at its opposite end an arm 64 connected by a link 65 with another arm 66 on a rock shaft 67, the opposite end of which is connected by an arm 68 with a rod 69 that actuates back and forth the valve or other element for determining the flow of oil from the pump to the top or bottom of the cylinder 46, as the case may be, in order to move the tool carrier downwardly and upwardly.

The control member 61 is connected at its upper end to a manually operated lever 71 having a handle 72 which the operator moves to start movement of the tool carrier after the work is in position. The lever 71 is pivoted on a supporting arbor 73 and also pivoted thereon is a bell crank 74 that is normally connected to the hand lever 71 for movement therewith by means of a spring pin 75 actuated by a spring 76, the pin 75 being mounted in a pocket in the lever 71 and engaging a recess 77 in the bell crank 74, see Figures 8, 12 and 13. To release the hand lever from the bell crank, the spring pin 75 is withdrawn and turned, as shown in Figure 13, being held in such outward position by a pin 78 engageable with an opening 79 when the parts are locked together.

The other arm of the bell crank 74 is connected to a cam controlled device in the form of a lever 81 which is supported by the bell crank 74 and by a link 82, the latter being pivotally supported at 83 on a fixed bearing. The lever 81 carries a pin 85 engageable in a camway 86 that is mounted on the side of the tool carrier. 87 designates a rod connected to the bell crank 74, as shown in Figure 8, and 88 is a spring surrounding said rod and held between a stop plate 89 at the lower end of the rod and a stationary wall 90, said spring being normally under compression and acting to pull the rod downwardly and thereby hold the parts in the normal position shown in Figure 8.

Referring to Figure 3, it will be observed that the tool carrier must travel from its uppermost position downwardly to the bottom of the live center support before the tools engage the work, and it is desirable that this part of the travel of the tool carrier be at a faster speed. To effect this, the camway 86 includes a portion 91 that moves the lever 81 to the extreme right of Figure 8 during the initial downward travel of the tool carrier, causing the control member 61 to be correspondingly moved so as to effect faster action of the liquid pressure on the piston which governs the movement of the tool carrier.

Referring to Figures 8 to 10, and assuming the parts in the initial position of Figure 8, the operator moves the handle 72 downwardly, shifting the parts to the position shown in Figure 9, causing a corresponding movement of the control member 61 and forcing oil to the top of the cylinder 46. Piston 45 thereupon moves downwardly, carrying with it the tool carrier, such movement being faster while the cam operated lever 81 is engaged with the portion 91 of the camway, and thereafter said lever comes into engagement with the upper part of the camway, as shown in Figure 10, positioning the control member so as to cause a slow downward movement of the tool carrier until it reaches its extreme lowermost position.

When this occurs, the uppermost part of the camway will have reached the pin 85 of the lever 81, and the spring controlled rod 87 then throws the lever 81 to the left, bringing it into position to cooperate with the portion 92 of the camway, and at the same time throwing the control member 61 so as to reverse the flow of oil from the top into the bottom of the cylinder 46 and moving the piston 45 upwardly. This movement continues until the camway again reaches its uppermost position, at the end of which movement, the portion 93 of the camway forces the pin 85 and lever 81 back to the initial position of Figure 8 and brings the tool carrier to a stop.

It will be seen that after the lever 71 is initially moved by the operator, travel of the tool carrier downwardly and thence upwardly follows automatically, bringing the tool carrier to its intial position and the cycle is completed. If for any reason the operator desires to stop the machine before the cycle is completed, he withdraws the spring pin 75, disconnecting the hand lever 71 from the bell crank 74, and the lever 71 and with it the control member 61 can then be moved immediately to the initial position of Figure 8 to stop further travel of the tool carrier at any desired point.

It is necessary to afford a means for locking the live center 9 to the work roll 5, and this is accomplished by the structure shown in Figures 18 to 20, in which 121 designates a collar surrounding the center 9 and having a pair of upstanding lugs 122 for engagement with corresponding recesses in the support 10. On its lower side, the collar 121 has a lug 123 that is shaped to engage a recess 124 which is conventionally formed in a husking roll. The center 9 is held tightly in engagement with its support 10 by frictional contact, as usual in such structures, recess 125 being provided to permit insertion of a wedge for forcing out the center when desired, and the collar 121 is held tightly on the center 9 preferably by having the opening in the collar slightly smaller than the diameter of the center 9, and forcing the collar thereon. In the operation of the machine, the work roll is first positioned on the lower or dead center and the live center is then lowered into the position shown in Figures 3 and 18 for engagement with the work roll, this being accomplished by the following mechanism.

At the upper end of the support 10 is a rack 131 which holds and is connected for vertical movement with the support 10, but permits rotation of the latter. The rack 131 is operated by a pinion 132, see Figures 3 and 14, and pinion 132 is fixed on an arbor 133 mounted for rotation in a suitable stationary bearing. The arbor 133 carries fixed thereon a collar 134 provided with a series of pockets 135 having inclined bottoms, as shown in Figures 15 and 16. 136 designates a capstan rotatably mounted on the arbor 133 and including an annular or ring-like portion 137 that surrounds the collar 134 and is located between said collar and a fixed wall 138. The annular portion 137 of the capstan has a series of recesses 139 therein and 140 designate balls located in said recesses 139 and pockets 135.

Referring to Figures 14 to 16, when it is desired to lower the live center into engagement with the work, the capstan 136, including the annular portion 137, is turned in an anti-clockwise direction with reference to Figure 15 the weight of the live center and associated parts causing it to easily move downwardly with collar 134 following the balls 140, as shown in Figure 15, until the center comes in contact with the work, thereby offering resistance to further turning of the collar 134. Further movement of the capstan then brings the balls 140 into the position shown in Figure 16, wedging them between the bottoms of pockets 135 of the collar 134 and the stationary wall 138. In this manner, the center is held in clamped relation to the work during operation of the tools, as the tool carrier travels downwardly. Following the completion of the operation on the blank, the center is released by turning the capstan and annular portion 137 in a clockwise direction with reference to Figure 16, releasing the balls 140 until they assume the position shown in Figure 15, so that further movement of the capstan in a clockwise direction turns the collar 134 therewith and likewise pinion 132, moving the live center upwardly.

The operation of the machine briefly is as follows: With the parts in the position shown in Figure 1, the tool carrier being at the limit of its upward travel, a blank such as a husking roll 5 is placed on the dead center at the bottom, the operator holding the upper end of the roll in proper position to receive the live center and at the same time turning the capstan 136 in an anti-clockwise direction with reference to Figure 15 until the parts assume the position shown in Figure 16. The live center is then clamped to the work and the latter ready for a machining operation. The operator depresses hand lever 71, see Figure 8, causing the cam operated lever 81 to move to the right, as in Figure 9, and operating the control member 61 so as to start movement of the oil pressure to the top of the cylinder 46. This causes the piston 45 and with it the tool carrier to travel downwardly, until camway 86 reaches its lowest position, whereupon the cam operated lever 81 is shifted to the left with reference to Figure 10 by the spring rod 87. This causes the control member 61 to be operated in the opposite direction so that the oil pressure passes to the bottom instead of the top of cylinder 46 and moves the tool carrier upwardly until it reaches its uppermost point, as shown in Figure 8, with the cam operated lever 81 and control member 61 again in neutral position and the parts are then ready for removal of the work and a repetition of the operation.

While the invention has been set forth with respect to certain structural details, it is not limited to the exact embodiments herein shown, and this application is intended to cover such departures or modified arrangements as may come within the purposes of the several improvements or the scope of the following claims.

I claim:

1. A vertical turning machine comprising a vertically reciprocatory tool carrier, live and dead centers for supporting a work piece in a vertical position, means on the live center for engaging and turning the work piece, a movable support for the live center, a sleeve within which the support is movable to engage the live center with and disengage it from the work piece, means for retaining said support against turning movement relatively to the sleeve, and gearing connected to the sleeve for turning it.

2. A turning machine comprising a frame, live and dead centers for supporting a work piece, a tool carrier movable relatively to the work piece, said tool carrier comprising a platform having an opening which surrounds the work during movement of the carrier, means for mounting a series of tools on the platform around the work, steadying means also mounted on said platform and engaging the work, and means positively engaging the work to turn it.

3. A vertical turning machine comprising a vertically reciprocatory tool carrier including a platform having an opening that surrounds the work during movement of the carrier, a series of tools mounted on said platform around the work, live and dead centers for supporting and turning the work while in a vertical position, a support for the live center, a sleeve within which the support is movable vertically, said support being held against turning movement relatively to the sleeve, gearing connected to the sleeve for rotating it, and interlocking means between the sleeve and the work for positively rotating the work.

4. A vertical turning machine comprising a vertically reciprocatory tool carrier, live and dead centers for supporting and turning the work while in vertical position, a support for one of said centers, a rack connected to the support, a pinion for operating the rack vertically, a sleeve surrounding the support and held against turning movement relatively thereto, a worm gear fixed to the sleeve, a driving worm engaging said worm gear, and means on the sleeve for positively engaging the work.

5. A vertical turning machine comprising a column, a tool carrier guided and movable vertically on the column, centers for supporting and turning the work in a vertical position, the tool carrier including a platform having an opening surrounding the work during movement of the carrier, steadying means mounted on the platform and engageable with the work, a series of tools mounted on the platform and also engageable with the work, and fluid pressure means for operating the tool carrier comprising a cylinder and piston and a rod connecting one of said last named parts with the tool carrier, said rod being located between the work and the aforesaid column.

6. A vertical turning machine comprising a column, a tool carrier guided and movable vertically on the column, live and dead centers for supporting and turning the work while in vertical position, a support for one of said centers, a sleeve within which said support is vertically movable, the sleeve being held against turning movement relatively to the support, gearing for rotating the sleeve, fluid pressure means for operating the tool carrier comprising a cylinder and piston, and a rod connecting one of the last named parts with the tool carrier, said rod located between the work and the aforementioned column.

7. In a machine tool, the combination with a work engaging member, of means for holding said member in operative position comprising a rotatable pinion connected with said member for moving it against the work, a spindle on which said pinion is fixedly mounted, a collar fixed on said spindle having a series of ball pockets, a fixed wall surrounding said collar in spaced relation thereto, an operating ring located between said fixed wall and the collar and having a series of openings registering with the pockets in the collar, and balls located in said openings and pockets and operable to cause the collar and operating ring to move together in one direction and to lock the collar against the wall when the ring moves in the opposite direction.

8. A vertical turning machine comprising a vertically reciprocatory tool carrier, live and dead centers for supporting and turning the work while in a vertical position, a support for one of said centers, means for rotating the support, rack and pinion means for elevating or lowering said support, and means for holding the support in operative position comprising a spindle on which said pinion is fixed, a collar keyed to said spindle, a stationary wall surrounding said collar and spaced therefrom, the collar having a series of pockets therein, an operating ring located between the collar and the stationary wall and having a series of openings adapted to register with said pockets, and balls located in said openings and pockets and operable to cause the collar and ring to move together in one direction and to lock the collar against the stationary wall when the ring is moved in the opposite direction.

9. A vertical turning machine comprising a vertically reciprocatory tool carrier, live and dead centers for supporting and turning the work while in a vertical position, a vertically movable support for one of said centers, and a collar surrounding said center having interlocking engagement with said support and with the work.

10. A vertical turning machine comprising a vertically reciprocatory tool carrier, live and dead centers for supporting and turning the work while in vertical position, a vertically movable support for one of said centers, and a collar surrounding said center and having oppositely disposed lugs engageable with corresponding recesses in the edge of the support and an oppositely extending lug engaging a recess in the edge of the work.

11. In a machine tool, the combination with a carrier and fluid pressure means for actuating the carrier, of devices for governing said fluid pressure means comprising a control member, a manually operated lever connected to the control member for moving it, a pivoted bell crank normally locked for movement with said lever, a camway on the carrier, a cam actuated device cooperating with said camway and connected to said bell crank, and a spring connected to the bell crank and tending to return the control member to neutral position.

12. In a machine tool, the combination with a carrier and fluid pressure means for actuating the carrier, of devices for governing the fluid pressure means comprising a control member, a pivoted hand lever connected to the control member, a bell crank pivoted coaxially with said lever, a releasable spring pin connecting the bell crank and hand lever for normal simultaneous movement, a camway on the carrier, a cam actuated device controlled by said camway and connected to the bell crank, and a spring actuated rod also connected to said bell crank for moving the control member toward neutral position.

In witness whereof, I have hereunto signed my name.

ALFRED TROSCH.